(12) United States Patent
Lefebvre

(10) Patent No.: US 11,629,615 B2
(45) Date of Patent: Apr. 18, 2023

(54) STRUT REINFORCING STRUCTURE FOR A TURBINE EXHAUST CASE

(71) Applicant: PRATT & WHITNEY CANADA CORP., Longueuil (CA)

(72) Inventor: Guy Lefebvre, St-Bruno-de-Montarville (CA)

(73) Assignee: PRATT & WITHNEY CANADA CORP., Longueuil (CA)

( * ) Notice: Subject to any disclaimer, the term of this patent is extended or adjusted under 35 U.S.C. 154(b) by 12 days.

(21) Appl. No.: 17/331,743

(22) Filed: May 27, 2021

(65) Prior Publication Data

US 2022/0381156 A1  Dec. 1, 2022

(51) Int. Cl.
   *F01D 25/26* (2006.01)
(52) U.S. Cl.
   CPC .......... *F01D 25/26* (2013.01); *F05D 2220/32* (2013.01); *F05D 2240/14* (2013.01)
(58) Field of Classification Search
   CPC ........ F01D 25/162; F01D 25/30; F01D 25/24; F01D 9/065; F02C 7/20
   See application file for complete search history.

(56) References Cited

U.S. PATENT DOCUMENTS

| | | | | |
|---|---|---|---|---|
| 5,224,341 A | * | 7/1993 | Munroe | F02C 7/20 415/189 |
| 5,746,574 A | * | 5/1998 | Czachor | F01D 25/243 415/176 |
| 6,511,284 B2 | * | 1/2003 | Darnell | F01D 9/065 415/176 |
| 7,100,358 B2 | * | 9/2006 | Gekht | B23K 15/04 60/770 |
| 7,891,165 B2 | | 2/2011 | Bader et al. | |
| 7,909,573 B2 | * | 3/2011 | Cameriano | F01D 25/162 415/214.1 |
| 9,316,108 B2 | | 4/2016 | Pegan, Jr. et al. | |
| 9,631,517 B2 | | 4/2017 | Liles et al. | |
| 9,765,648 B2 | * | 9/2017 | Kullenberg | F01D 9/041 |
| 9,970,320 B2 | * | 5/2018 | De Sousa | F01D 25/243 |
| 10,227,895 B2 | * | 3/2019 | Farah | F01D 25/24 |

(Continued)

FOREIGN PATENT DOCUMENTS

| | | | | |
|---|---|---|---|---|
| FR | 3096345 A1 | * | 11/2020 | |
| JP | 4809796 B2 | * | 11/2011 | F01D 25/162 |
| WO | WO-2021219949 A1 | * | 11/2021 | F01D 25/162 |

OTHER PUBLICATIONS

European Search Report for corresponding application EP 22175642, dated Oct. 13, 2022 (Year: 2022).*

(Continued)

*Primary Examiner* — Topaz L. Elliott
(74) *Attorney, Agent, or Firm* — Norton Rose Fulbright Canada LLP

(57) ABSTRACT

A turbine exhaust case (TEC) has an outer case and an inner case structurally interconnected by a plurality of circumferentially spaced-apart struts. At least one of the struts has an airfoil body with a hollow core. The airfoil body has opposed pressure and suction sides extending chordwise from a leading edge to a trailing edge and spanwise from a radially inner end to a radially outer end. The radially inner end of the strut has a strut wall extension that extends through the inner case to a location radially inward of the inner case relative to the central axis.

17 Claims, 5 Drawing Sheets

(56) References Cited

U.S. PATENT DOCUMENTS

| | | | |
|---|---|---|---|
| 10,329,956 B2* | 6/2019 | Scott | F01D 9/065 |
| 10,330,011 B2 | 6/2019 | Chuong et al. | |
| 11,448,097 B1* | 9/2022 | Lefebvre | F01D 25/162 |
| 2005/0109013 A1* | 5/2005 | Eleftheriou | F02K 3/06 |
| | | | 60/226.1 |
| 2006/0010852 A1* | 1/2006 | Gekht | F02K 1/386 |
| | | | 60/262 |
| 2006/0153681 A1* | 7/2006 | Lee | F01D 5/145 |
| | | | 416/97 R |
| 2006/0260127 A1* | 11/2006 | Gekht | F01D 9/065 |
| | | | 29/889.21 |
| 2007/0217911 A1* | 9/2007 | Cameriano | F02C 7/20 |
| | | | 415/220 |
| 2010/0132377 A1* | 6/2010 | Durocher | F01D 9/065 |
| | | | 60/797 |
| 2013/0177410 A1* | 7/2013 | Eleftheriou | F01D 25/24 |
| | | | 415/208.1 |
| 2013/0227930 A1* | 9/2013 | Pegan, Jr. | F01D 25/162 |
| | | | 415/220 |
| 2014/0341730 A1* | 11/2014 | Kullenberg | F01D 25/162 |
| | | | 415/211.2 |
| 2015/0107223 A1* | 4/2015 | Mountz | F01D 25/005 |
| | | | 60/226.3 |
| 2015/0285098 A1* | 10/2015 | De Sousa | F01D 25/243 |
| | | | 415/214.1 |
| 2015/0337687 A1 | 11/2015 | Scott et al. | |
| 2016/0017807 A1* | 1/2016 | Chuong | F01D 25/30 |
| | | | 415/213.1 |
| 2016/0186614 A1* | 6/2016 | Paulino | F01D 25/243 |
| | | | 415/211.2 |
| 2017/0067369 A1* | 3/2017 | Hashimoto | F01D 9/02 |
| 2017/0241282 A1* | 8/2017 | Boeck | F16J 15/104 |
| 2018/0195416 A1* | 7/2018 | Jouy | F02C 9/18 |
| 2020/0240292 A1* | 7/2020 | Strömberg | F01D 25/162 |
| 2022/0381156 A1* | 12/2022 | Lefebvre | F01D 25/162 |

OTHER PUBLICATIONS

European Written Opinion for corresponding application EP 22175642, dated Oct. 13, 2022 (Year: 2022).*

* cited by examiner

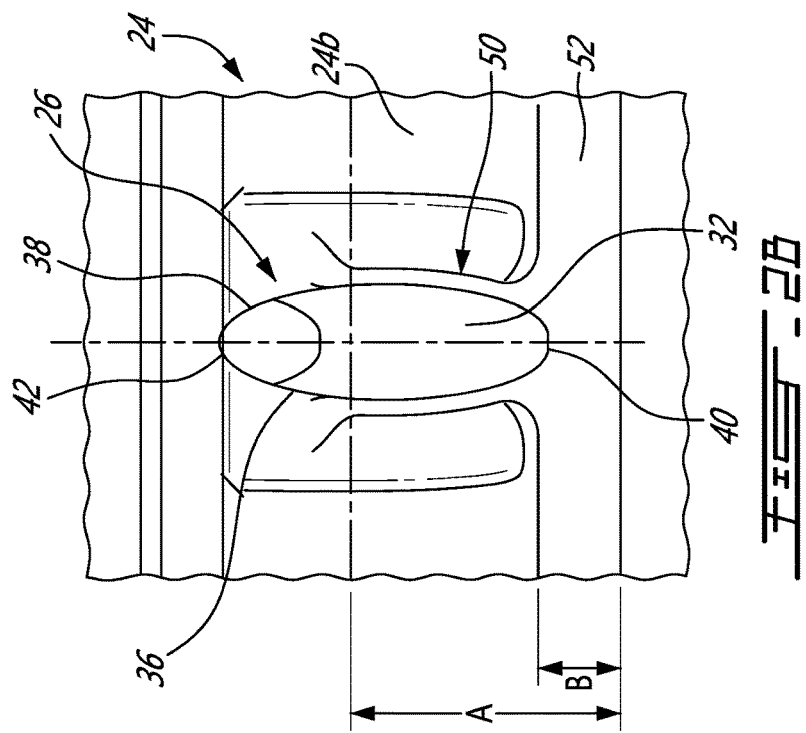
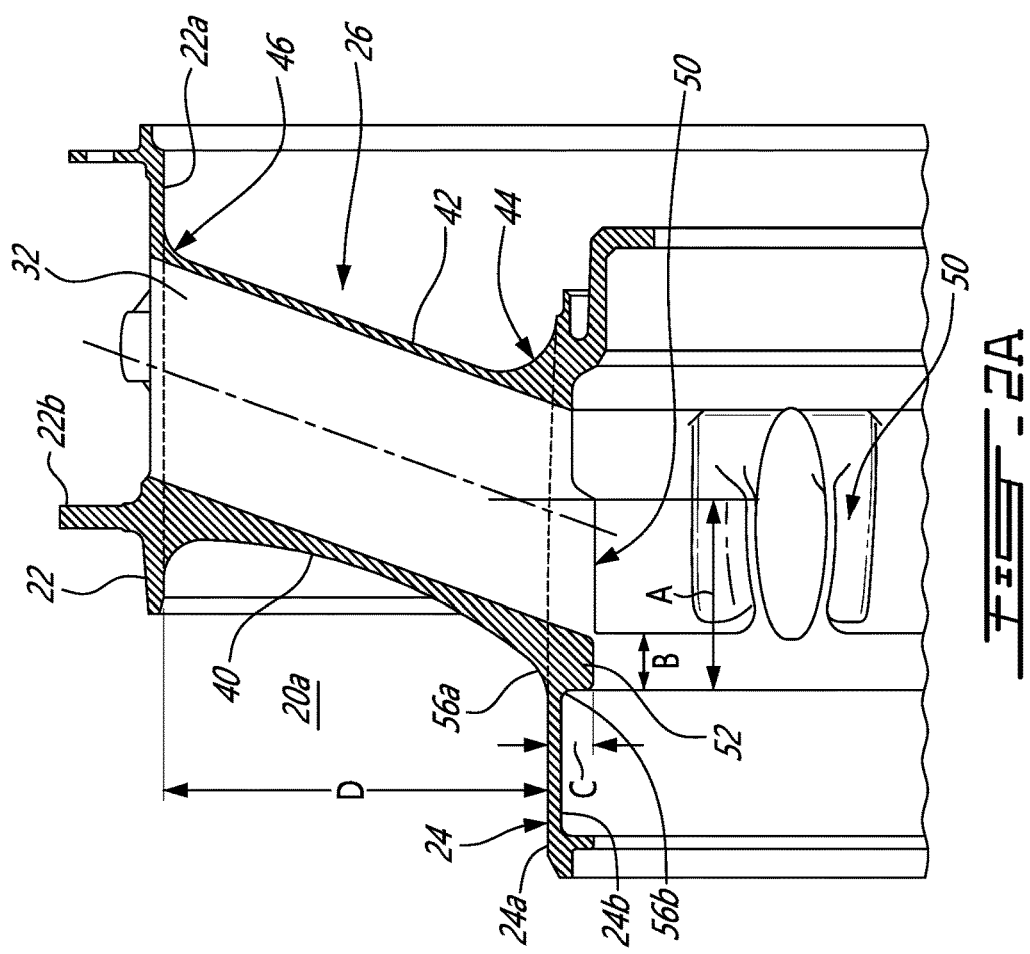

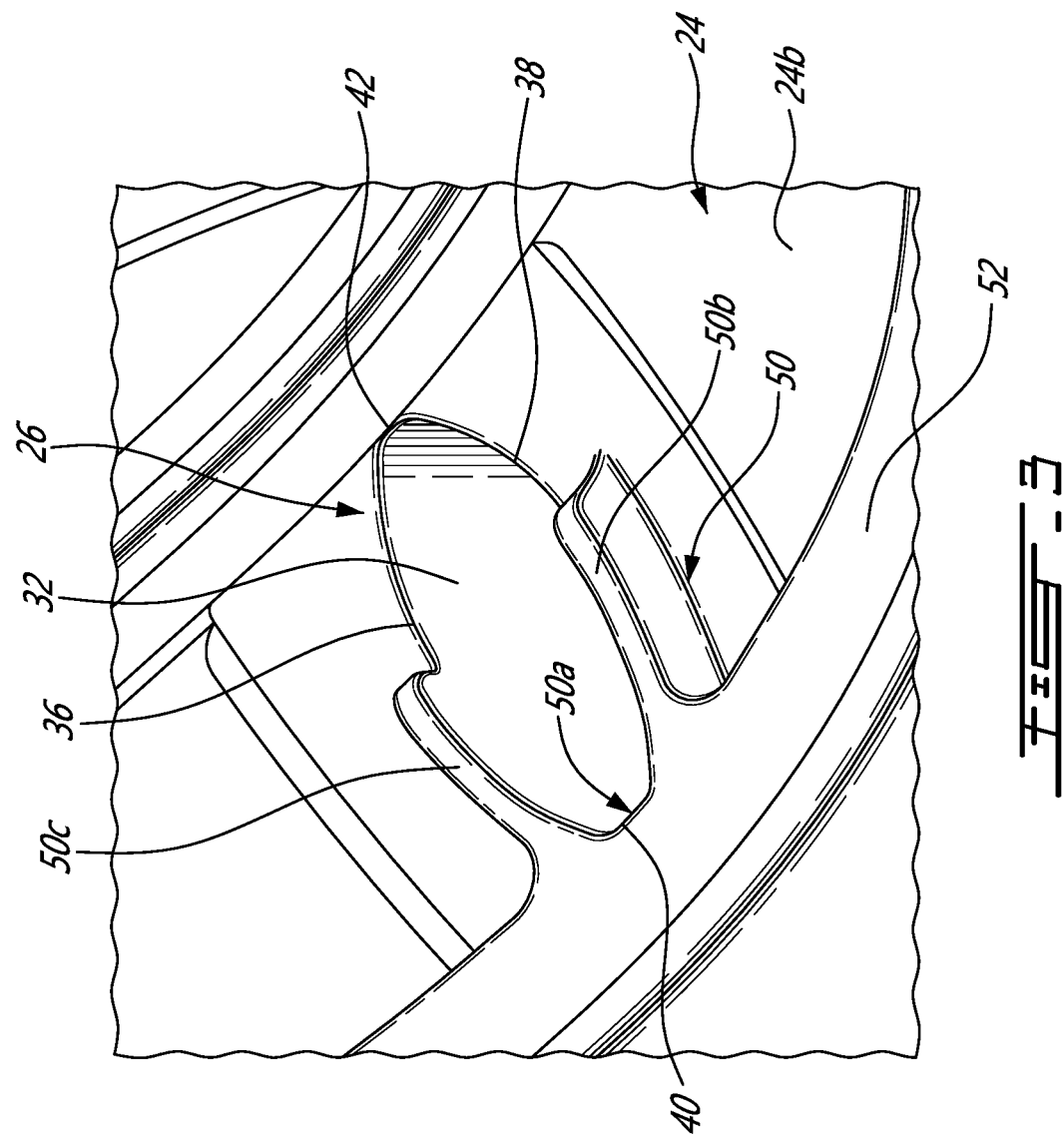

STRUT REINFORCING STRUCTURE FOR A TURBINE EXHAUST CASE

TECHNICAL FIELD

The application relates generally to a turbine exhaust case and, more particularly, to turbine exhaust struts.

BACKGROUND OF THE ART

Various factors exert pressures on aircraft engine manufacturers to continually improve their designs. Design improvements take many factors into consideration, such as weight, structural optimization, durability, production costs, etc. Accordingly, while known turbine exhaust cases were satisfactory to a certain extent, there remained room for improvement.

SUMMARY

In one aspect, there is provided a turbine exhaust case (TEC) comprising: an outer case extending around a central axis; an inner case concentrically disposed inside the outer case, the inner case having a radially outer surface facing away from the central axis and a radially inner surface facing towards the central axis; an annular exhaust gas path radially between the outer case and the inner case; and a plurality of circumferentially spaced-apart struts extending across the annular exhaust gas path and structurally connecting the inner case to the outer case, at least one of the plurality of circumferentially spaced-apart struts having an airfoil body with a hollow core, the airfoil body having opposed pressure and suction sides extending chordwise from a leading edge to a trailing edge and spanwise from a radially inner end to a radially outer end; wherein the radially inner end of the airfoil body has a strut wall extension that extends through the inner case to a location radially inward of the inner case relative to the central axis, the inner end of the airfoil body connected to the inner case on both the radially inner surface and the radially outer surface of the inner case.

In another aspect, there is provided a TEC comprising: an outer case extending around a central axis; an inner case concentrically disposed inside the outer case, the inner case having a radially inner surface facing towards the central axis and a stiffener ring projecting radially inwardly from the radially inner surface; an annular exhaust gas path between the outer case and the inner case; and a plurality of circumferentially spaced-apart struts extending across the annular exhaust gas path and structurally connecting the inner case to the outer case, each of the plurality of circumferentially spaced-apart struts having an airfoil body with a hollow core, the airfoil body having opposed pressure and suction sides extending from a leading edge to a trailing edge, each of the plurality of circumferentially spaced-apart struts further having a strut wall extension projecting radially inwardly through the inner case for connection with the stiffener ring on the radially inner surface of the inner case.

DESCRIPTION OF THE DRAWINGS

Reference is now made to the accompanying figures in which:

FIG. 2a is a schematic enlarged cross-section view of the TEC illustrating one of the reinforced struts having a strut wall extension projecting radially inwardly from the TEC inner ring, the strut wall extension joined to the radially inner surface of the inner ring via a fillet opposed to the fillet joining the inner end of the airfoil body of the strut with the radially outer surface of the inner ring;

FIG. 2b is a schematic axial plan view illustrating the strut wall extension when viewed from within the TEC inner ring;

FIG. 3 is an isometric view from within the inner structural ring of the TEC and illustrating the merging of the strut extension wall with a stiffener ring extending circumferentially along a radially inner surface of the inner ring;

DETAILED DESCRIPTION

Figure 1:
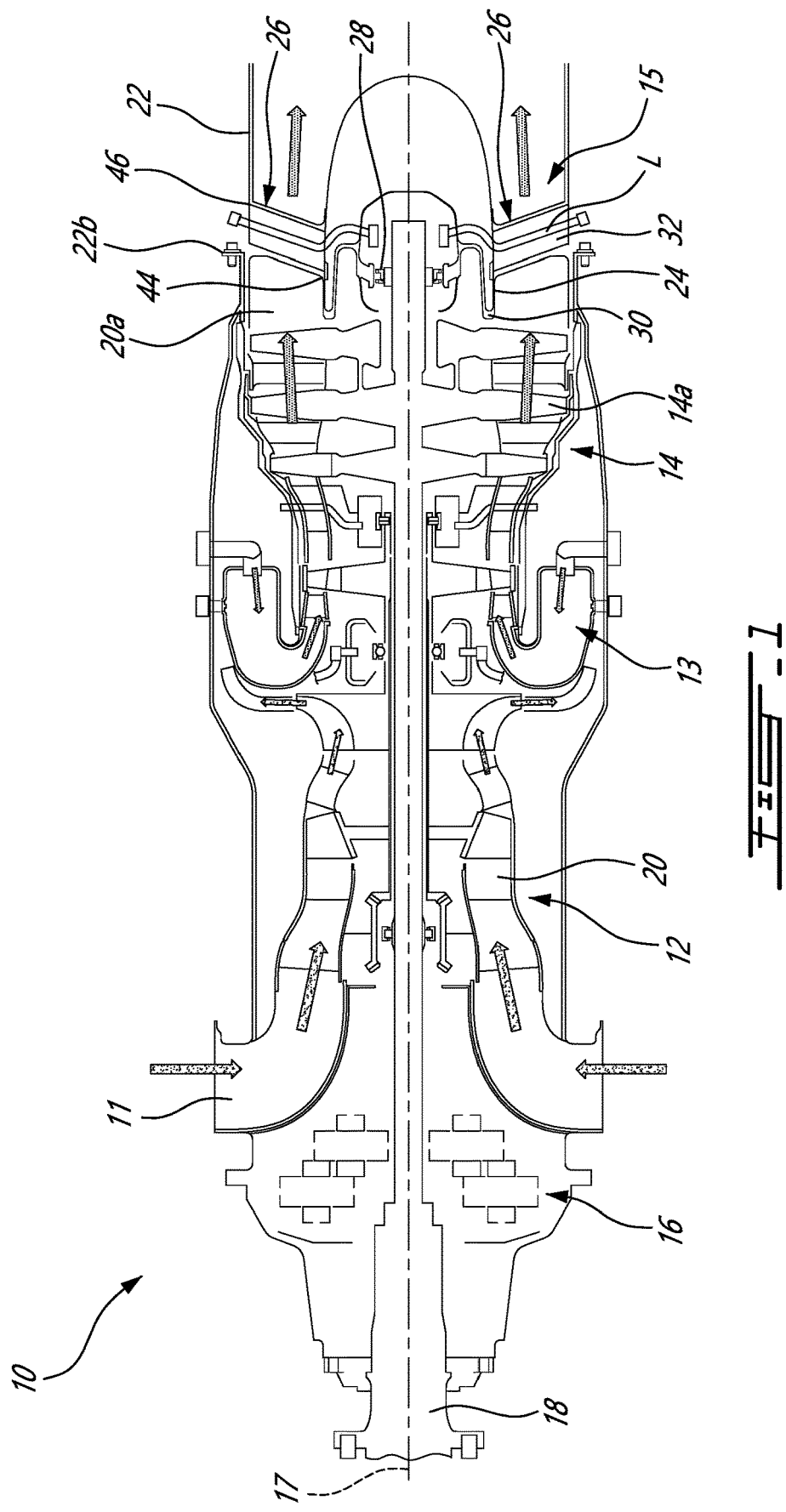
FIG. 1 is a schematic cross-section view of an exemplary turboprop gas turbine engine having a turbine exhaust case (TEC) with reinforced struts.
Figure 5:
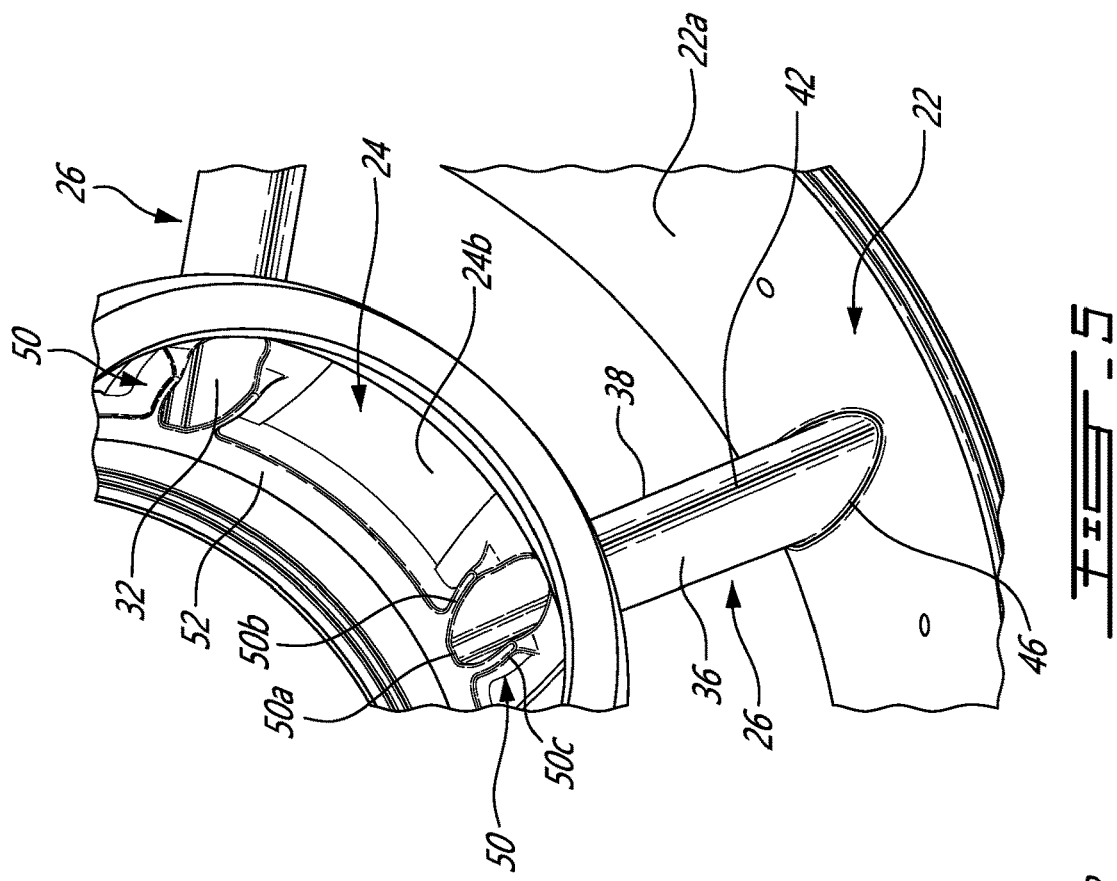
FIG. 5 is another enlarged isometric view of the TEC shown from a different inner perspective.
Figure 4:
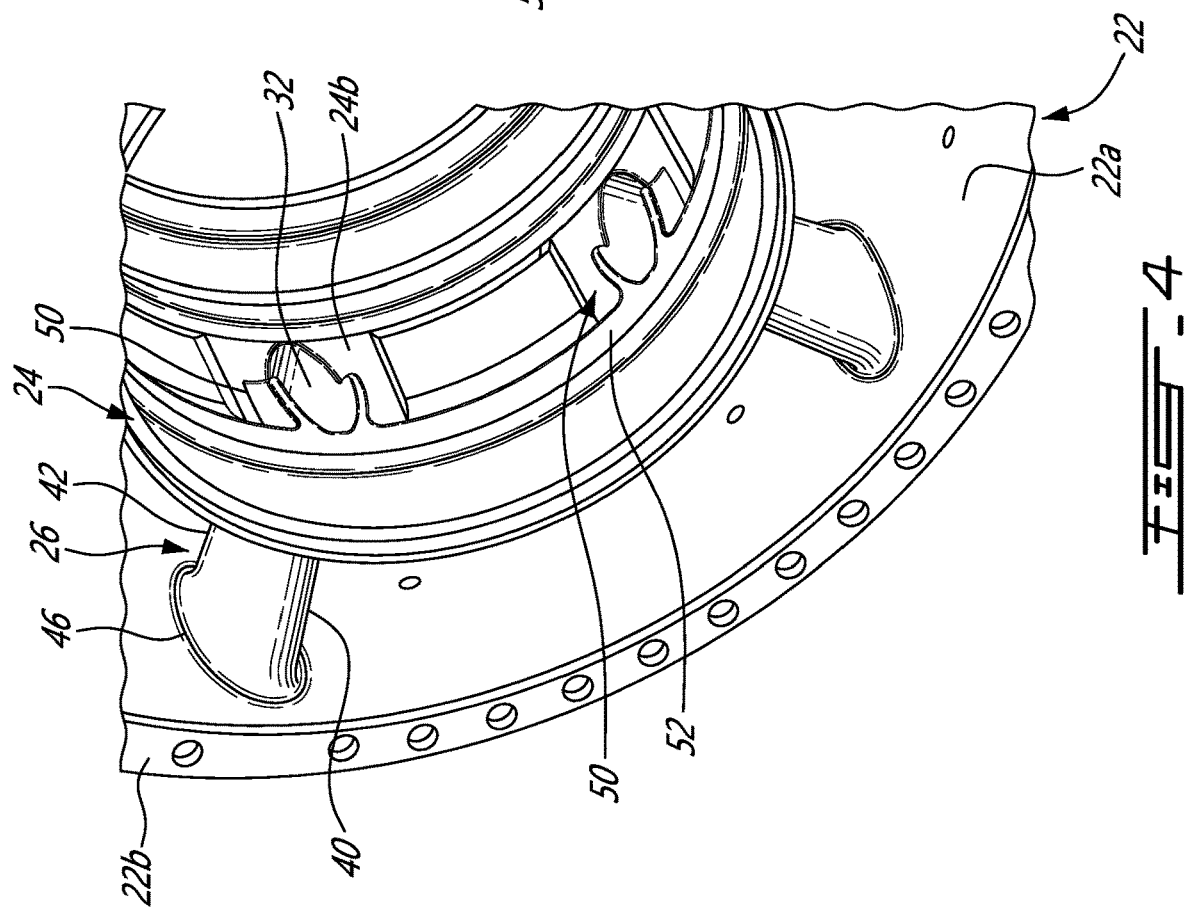
FIG. 4 is an enlarged isometric view of the TEC viewed from within the inner ring and illustrating the stiffener ring joining the strut wall extensions of the struts on the radially inner surface of the TEC inner ring portion.

FIG. 1 illustrates an aircraft engine of a type preferably provided for use in subsonic flight, and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and a turbine exhaust case (TEC) 15 through which the combustion gases exit the engine 10. The turbine 14 includes a low pressure (LP) turbine 14a (also known as a power turbine) drivingly connected to an input end of a reduction gearbox (RGB) 16. The RGB 16 has an output end drivingly connected to an output shaft 18 configured to drive a rotatable load (not shown). For instance, the rotatable load can take the form of a propeller or a rotor, such as a helicopter main rotor. The engine 10 has an engine centerline 17. According to the illustrated embodiment, the compressor and the turbine rotors are mounted in-line for rotation about the engine centerline 17.

Figure 7:
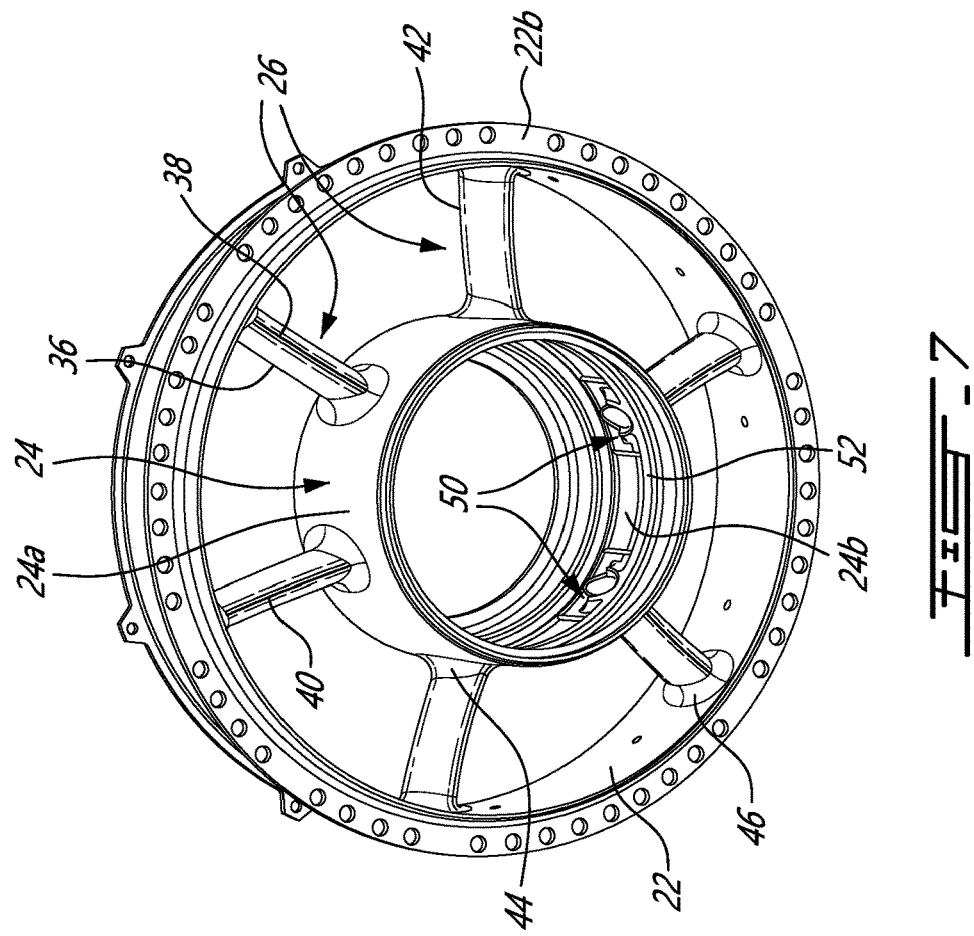
FIG. 7 is a front isometric view of the TEC.
Figure 6:
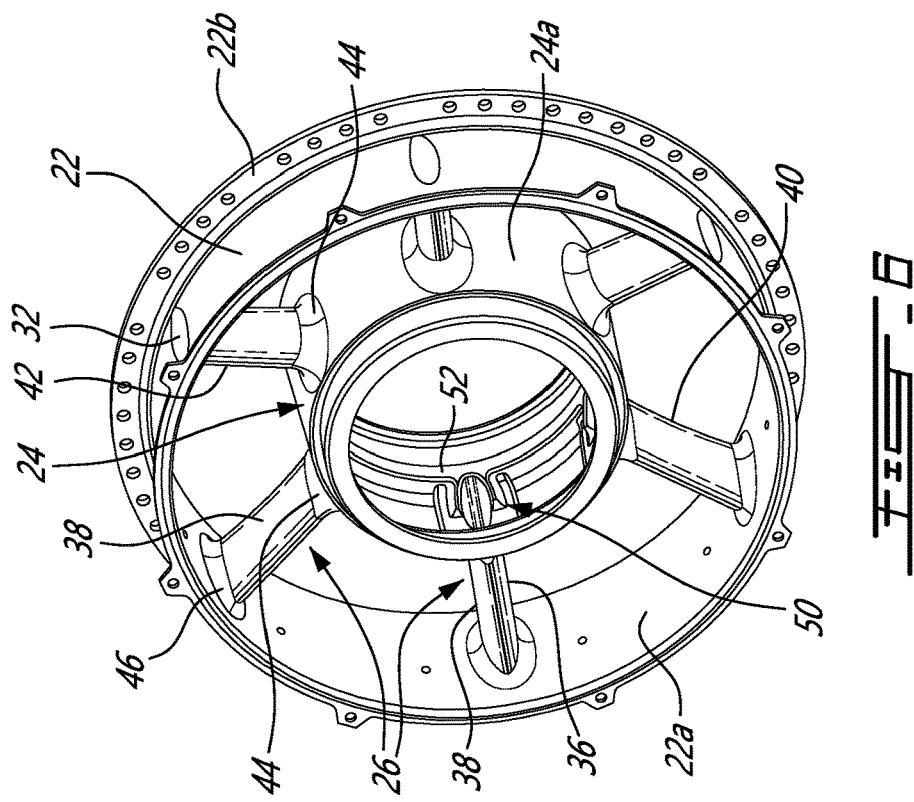
FIG. 6 is a rear isometric view of the TEC.

According to the embodiment shown in FIG. 1, the TEC 15 terminates the core gas path 20 of the engine. The TEC 15 is disposed immediately downstream of the last stage of the low pressure turbine 14a for receiving hot gases therefrom and exhausting the hot gases to the atmosphere. The TEC 15 comprises an outer case 22 having a radially inner surface 22a facing the centerline 17 and forming a radially outer delimitation (i.e. outer gas path wall) of an annular exhaust gas path 20a of the core gas path 20, an inner case 24 having a radially outer surface facing away from the centerline 17 and forming a radially inner delimitation (i.e. inner gas path wall) of the annular exhaust gas path 20a of the core gas path 20, and a plurality of turbine exhaust struts 26 (e.g. 6 struts in the embodiment shown in FIGS. 6 and 7) extending generally radially across the annular exhaust gas path 20a. As shown in FIGS. 6 and 7, the struts 26 are circumferentially interspaced from one another. The outer and inner cases 22, 24 are provided in the form of outer and inner structural rings concentrically mounted about the engine centerline 17. According to some embodiments, the outer case 22 may be bolted or otherwise suitably mounted to the downstream end of the turbine case via a flange connection. For instance, as exemplified in FIGS. 1, 6 and 7, the outer case 22 can have an outer flange 22b bolted to a corresponding flange at the downstream end of the turbine case. The struts 26 structurally connect the inner case 24 to the outer case 22. According to the embodiment illustrated in FIG. 1, the inner case 24 is configured to support a bearing 28 of the LP spool via a hairpin connection 30 or the like. The struts 26 provide a load path for transferring loads from the inner case 24 (and thus the bearing 28) to the outer case 22. According to some embodiments, the outer case 22, the inner case 24 and the struts 26 are of unitary construction. For instance, the outer case 22, the inner case 24 and the struts 26 can be integrally formed as a monolithic component. According to one aspect, the TEC 15 is unitary cast component.

Referring jointly to FIGS. 1-7, it can be appreciated that the exemplified struts 26 have an airfoil profile to serve as vanes for guiding the incoming flow of hot gases through the exhaust gas path 20a. According to the illustrated example, each of the struts 26 has an airfoil body with a hollow core 32, the airfoil body having opposed pressure and suction side walls 36, 38 extending chordwise from a leading edge 40 to a trailing edge 42 and spanwise from a radially inner end 44 to a radially outer end 46. As shown in FIG. 1, the hollow core 32 of the struts 26 may provide an internal passageway for service lines L and the like.

In certain engine running conditions, high thermal gradients may be developed across the struts 26. This is particularly true during transient engine cycles due to the flow swirl angle. In such instances, the delta temperature (ΔT) between the pressure and suction side walls 36, 38 of the struts 26 may result in relatively high bending stresses in the pressure and suction side walls 36, 38. Such bending stresses may create high stress concentration at the junction of the struts 26 with the inner case 24. According to some embodiments, this undesirable stress can be relieved and/or at least partly moved out from the strut-inner case junctions by extending at least a portion of the strut wall to a radially inner side of the inner case 24, thereby allowing the struts 26 to be connected/joined to the inner case 24 on both the radially outer and the radially inner surfaces 24a, 24b of the inner case 24.

As shown in FIGS. 2-7, the inner end 44 of each strut 26 may have a strut extension wall 50 extending radially through the inner case 24 to a location radially inward thereof. According to some embodiments, the strut wall extension 50 has a leading edge component or segment 50a extending in a spanwise direction in continuity to the leading edge of the airfoil body of the strut 26, a suction side extension component or segment 50b extending in a spanwise direction in continuity to the strut suction side wall 38 and a pressure side extension component or segment 50c extending in a spanwise direction in continuity to the strut pressure side wall 36. The suction side extension segment 50b and the pressure side extension segment 50c extend in a chordwise direction from the leading edge extension segment 50a towards the trailing edge 42 of the strut 26. According to the illustrated embodiment and as best shown in FIGS. 2a, 2b and 3, the suction and pressure side extension segments 50b, 50c of the strut wall extension 50 extend chordwise along only a portion of the chord length of the strut 26 and confer to the strut wall extension a horseshoe cross-sectional shape. According to one aspect, the strut wall extension 50 can start at the leading edge 40 of the strut 26 and follow the airfoil contour up to about 50% of the strut chord (i.e. the strut wall extension 50 terminates in a mid-chord region of the airfoil body). However, it is understood that depending on the level of stress concentration and the location thereof, the chord dimension of the strut wall extension 50 may vary. For instance, the strut wall extension 50 could extend from the leading edge 40 to the trailing edge 42. However, this would increase the weight of the TEC 15. According to another variant, the strut wall extension 50 could extend chordwise from the leading edge 40 to a location less than half of the strut chord. For instance, the strut wall extension 50 could extend along only the first 40% of the strut chord starting from the strut leading edge 40. The skilled reader will understand that various chordwise dimensioning are possible depending on the loading condition of the struts 26.

As can be appreciated from FIGS. 2-7, the strut wall extension 50 merges with a stiffener ring 52 projecting from the radially inner surface 24b of the inner case 24. The stiffener ring 52 extends along a full circumference of the inner case 24 and structurally interconnects the individual struts 26 via their respective strut wall extensions 50. The stiffener ring 52 is axially disposed to span the leading edge 40 at the inner end 44 of the struts 26. The stiffener ring also extends axially forwardly relative to the leading edge 40. According to one aspect, the stiffener ring 52 and the strut wall extension 50 are integrally formed as a monolithic structure. According to another aspect, the whole TEC 15 (including the strut wall extension 50 of the struts 26 and the stiffener ring 52 on the inner case 24) is casted as a unitary component.

Referring more particularly to FIGS. 2a and 2b, it can be appreciated that the stiffener ring 52 merges with the leading edge segment 50a of each strut wall extension 50. According to the illustrated exemplary strut reinforcing structure, the combined length (A) of the stiffener ring 52 and the strut wall extension 50 in the chordwise direction is greater than or equal to half the radial height (D) of the annular exhaust gas path 20a. Still according to the embodiment shown in FIGS. 2a and 2b, the stiffener ring 52 has an axial length (B) equal to about one-third of the combined length (A). According to another aspect, the radial height (C) of the stiffener ring 52 is greater than or equal to two-thirds of (B). The radial height (C) corresponds to the radial distance by which the stiffener ring (52) and the strut wall extension 50 extend from the radially inner surface 24b of the inner case 24.

As shown in FIG. 2a, an outer fillet 56a is provided at the juncture of the airfoil body of the strut 26 and the radially outer surface 24a of the inner case 24. The outer fillet 56a extends around the leading edge and along the pressure and suction side walls 36, 38 and around the trailing edge 42. The geometry of the outer fillet 56a can vary all around the periphery of the airfoil body from the leading edge 40 to the trailing edge 42. For instance, as shown in FIG. 2a, the outer fillet at the leading edge 40 of the strut 26 has a different radius than that of the outer fillet at the trailing edge 42 of the strut 26. Also, at a given peripheral location around the airfoil body, the outer fillet 56a can be a compounded fillet having a variable radius between the outer surface 24a of the inner case 24 and the airfoil body of the strut 26.

An inner fillet 56b is provided at the juncture of the strut wall extension 50 and the stiffener ring 52 with the radially inner surface 24b of the inner case 24. The inner fillet 56 extends around the leading edge extension segment 50a and along the suction and pressure side extension segments 50b, 50c. The inner fillet 56b is inverted relative to the outer fillet 56a. This provides for a reversed dual fillet arrangement between the inner end 44 of the strut 26 and the inner case. So connecting/joining the struts 26 on both the inner and outer sides of the inner case 24 allows minimizing strut deformation due to thermal variations.

The combination of the strut wall extensions 50 with the stiffener ring 52 on the radially inner side of the inner case 24 allows distributing the loads outside the struts 26, thereby relieving stress from the struts 26. For instance, the strut wall extensions 50 and the stiffener ring 52 can cooperate to remove tensile stress in the strut leading edge 40 when there is a high delta temperature between the struts 26 and cases 22, 24 of the TEC 15. According to another aspect, the strut wall extensions 50 and the stiffener ring 52 eliminate the need for a heavy structural inner case, thereby providing weight savings.

According to one aspect of the technology, there is provided a TEC having a strut wall structure extending through an inner gaspath wall such as to form a strut continuity across the inner gaspath wall building a reversed cast fillet on the radially inner side of the inner gaspath wall. By so connecting the strut on both radial sides of the gaspath wall, the strut can be reinforced and, thus, be less subject to deformation due to thermal variations.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, not all of the struts may incorporate the wall extension. Indeed, the TEC may include more than one strut configuration. Also, while FIG. 1 illustrates a turboprop engine, it is understood that the TEC 15 could be integrated to other types of engines. It is also understood that features from different embodiments can be intermixed. Yet further modifications could be implemented by a person of ordinary skill in the art in view of the present disclosure, which modifications would be within the scope of the present technology.

The invention claimed is:

1. A turbine exhaust case (TEC) comprising:
an outer case extending around a central axis;
an inner case concentrically disposed inside the outer case, the inner case having a radially outer surface facing away from the central axis and a radially inner surface facing towards the central axis;
an annular exhaust gas path radially between the outer case and the inner case; and
a plurality of circumferentially spaced-apart struts extending across the annular exhaust gas path and structurally connecting the inner case to the outer case, the plurality of circumferentially spaced-apart struts including a first strut having an airfoil body with a hollow core, the airfoil body having opposed pressure and suction sides extending chordwise from a leading edge to a trailing edge and spanwise from a radially inner end to a radially outer end;
wherein the radially inner end of the airfoil body has a strut wall extension that extends through the inner case to a location radially inward of the inner case relative to the central axis, the inner end of the airfoil body connected to the inner case on both the radially inner surface and the radially outer surface of the inner case, wherein the strut wall extension extends in a spanwise direction in continuity to the leading edge and the opposed pressure and suction sides of the airfoil body, and
wherein the strut wall extension extends chordwise along only a portion of the opposed pressure and suction sides of the airfoil body.

2. The TEC according to claim 1, wherein the strut wall extension has a horseshoe cross-sectional shape, and includes a suction side extension segment and a pressure side extension segment extending in a chordwise direction from a leading edge extension segment.

3. The TEC according to claim 2, wherein a stiffener ring projects radially inwardly from the radially inner surface of the inner case, the leading edge extension segment of the strut wall extension merging with the stiffener ring.

4. The TEC according to claim 3, wherein the annular exhaust gas path has a radial height (D), and wherein a combined length (A) of the stiffener ring and the strut wall extension in a chordwise direction is greater than or equal to half the radial height (D).

5. The TEC according to claim 4, wherein the stiffener ring has a length (B), and wherein (B) corresponds to one-third of (A).

6. The TEC according to claim 5, wherein the stiffener ring has a radial height (C), and wherein (C) is greater than or equal to two-thirds of (B).

7. The TEC according to claim 3, wherein the stiffener ring is monolithically formed with the strut wall extension.

8. The TEC according to claim 1, wherein the strut wall extension extends chordwise up to 50% of a total chord length of the airfoil body.

9. The TEC according to claim 1, wherein an outer fillet is provided between the airfoil body and the radially outer surface of the inner case, and wherein an inner fillet is provided between the strut wall extension and the radially inner surface of the inner case, the inner fillet being inverted relative to the outer fillet.

10. A TEC comprising:
an outer case extending around a central axis;
an inner case concentrically disposed inside the outer case, the inner case having a radially inner surface facing towards the central axis and a stiffener ring projecting radially inwardly from the radially inner surface;
an annular exhaust gas path between the outer case and the inner case; and
a plurality of circumferentially spaced-apart struts extending across the annular exhaust gas path and structurally connecting the inner case to the outer case, the plurality of circumferentially spaced-apart struts including a first strut having an airfoil body with a hollow core, the airfoil body having opposed pressure and suction sides extending from a leading edge to a trailing edge, the first strut further having a strut wall extension projecting radially inwardly through the inner case for connection with the stiffener ring on the radially inner surface of the inner case, wherein the strut wall extension has a pressure side extension segment and a suction side extension segment extending in a spanwise direction in continuity to the pressure side and suction side of the airfoil body, the pressure side extension segment and the suction side extension segment projecting in a chordwise direction from a leading edge extension segment, the leading edge extension segment monolithically merging with the stiffener ring, and
wherein the strut wall extension has a horseshoe cross-sectional shape.

11. The TEC according to claim 10, wherein the strut wall extension extends chordwise up to 50% of a total chord length of the airfoil body.

12. The TEC according to claim 10, wherein the annular exhaust gas path has a radial height (D), and wherein a combined length (A) of the stiffener ring and the strut wall extension in a chordwise direction is greater than or equal to half the radial height (D).

13. The TEC according to claim 12, wherein the stiffener ring has a length (B), and wherein (B) corresponds to one-third of (A).

14. The TEC according to claim 13, wherein the stiffener ring has a radial height (C), and wherein (C) is greater than or equal to two-thirds of (B).

15. The TEC according to claim 10, wherein the stiffener ring is monolithically casted with the strut wall extension.

16. The TEC according to claim 10, wherein the inner case has a radially outer surface facing outward away from the central axis, wherein a first fillet is provided between the airfoil body and the radially outer surface of the inner case, and wherein a second fillet is provided between the strut wall extension and the radially inner surface of the inner case, the second fillet being inverted relative to the first fillet.

17. A turbine exhaust case (TEC) comprising:
an outer case extending around a central axis;
an inner case concentrically disposed inside the outer case, the inner case having a radially outer surface facing away from the central axis and a radially inner surface facing towards the central axis;
an annular exhaust gas path radially between the outer case and the inner case; and
a plurality of circumferentially spaced-apart struts extending across the annular exhaust gas path and structurally connecting the inner case to the outer case, the plurality of circumferentially spaced-apart struts including a first strut having an airfoil body with a hollow core, the airfoil body having opposed pressure and suction sides extending chordwise from a leading edge to a trailing edge and spanwise from a radially inner end to a radially outer end;
wherein the radially inner end of the airfoil body has a strut wall extension that extends through the inner case to a location radially inward of the inner case relative to the central axis, the inner end of the airfoil body connected to the inner case on both the radially inner surface and the radially outer surface of the inner case, and
wherein an outer fillet is provided between the airfoil body and the radially outer surface of the inner case, and wherein an inner fillet is provided between the strut wall extension and the radially inner surface of the inner case, the inner fillet being inverted relative to the outer fillet, and
wherein each fillet has a radius that provides a smooth transition from the airfoil body to the inner case.

* * * * *